United States Patent
Xu et al.

(10) Patent No.: US 10,769,417 B2
(45) Date of Patent: Sep. 8, 2020

(54) PAYMENT METHOD, APPARATUS, AND SYSTEM

(71) Applicant: Alibaba Group Holding Limited, George Town, Grand Cayman (KY)

(72) Inventors: Wei Xu, Beijing (CN); Liang Li, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/512,434

(22) Filed: Jul. 16, 2019

(65) Prior Publication Data

US 2020/0019762 A1 Jan. 16, 2020

(30) Foreign Application Priority Data

Jul. 16, 2018 (CN) .......................... 2018 1 0778548

(51) Int. Cl.
*G06K 9/00* (2006.01)
*G06K 9/20* (2006.01)
*G06Q 20/40* (2012.01)

(52) U.S. Cl.
CPC ..... *G06K 9/00295* (2013.01); *G06K 9/00248* (2013.01); *G06K 9/00255* (2013.01); *G06K 9/00281* (2013.01); *G06K 9/209* (2013.01); *G06Q 20/40145* (2013.01)

(58) Field of Classification Search
CPC ........... G06K 9/00295; G06K 9/00248; G06K 9/00281; G06K 9/209; G06K 9/00255; G06Q 20/40145
See application file for complete search history.

(56) References Cited

U.S. PATENT DOCUMENTS

| 6,072,894 A | 6/2000 | Payne |
| 6,128,398 A | 10/2000 | Kuperstein et al. |
| 7,130,454 B1 * | 10/2006 | Berube .............. G06K 9/00234 382/118 |
| 2008/0212849 A1 | 9/2008 | Gao |

(Continued)

FOREIGN PATENT DOCUMENTS

| CN | 1319013 C | 5/2007 |
| CN | 102930457 A | 2/2013 |

(Continued)

OTHER PUBLICATIONS

International Search Report and the Written opinion dated Sep. 26, 2019, in counterpart International Application No. PCT/US2019/041793.

(Continued)

*Primary Examiner* — Bobbak Safaipour
(74) *Attorney, Agent, or Firm* — Finnegan, Henderson, Farabow, Garrett & Dunner, L.L.P.

(57) ABSTRACT

A payment method includes: acquiring a frontal face image, and a side face image from at least one side, of a to-be-identified user; identifying whether the to-be-identified user is an authorized user of a payment electronic account according to the frontal face image and the side face image that are acquired; and making a deduction operation on the payment electronic account if it is identified that the to-be-identified user is an authorized user of the payment electronic account.

17 Claims, 11 Drawing Sheets

(56) References Cited

U.S. PATENT DOCUMENTS

| | | | |
|---|---|---|---|
| 2012/0292388 A1* | 11/2012 | Hernandez | G06Q 20/3276 235/379 |
| 2013/0110525 A1* | 5/2013 | Whittier | G06Q 10/00 705/1.1 |
| 2016/0063235 A1 | 3/2016 | Tussy | |
| 2019/0087641 A1* | 3/2019 | Shen | G06T 7/90 |
| 2019/0163962 A1* | 5/2019 | Chan | H04L 67/22 |
| 2019/0303652 A1* | 10/2019 | Wang | G06K 9/00288 |
| 2020/0074148 A1* | 3/2020 | Xu | G06K 9/6256 |
| 2020/0143147 A1* | 5/2020 | Matsumoto | G06K 9/00281 |
| 2020/0160041 A1* | 5/2020 | Xu | G06K 9/00295 |
| 2020/0167548 A1* | 5/2020 | Xu | G06K 9/00248 |
| 2020/0167549 A1* | 5/2020 | Taoka | H04N 5/232945 |

FOREIGN PATENT DOCUMENTS

| | | |
|---|---|---|
| CN | 104732396 A | 6/2015 |
| CN | 106203387 A | 12/2016 |
| CN | 106326867 A | 1/2017 |
| CN | 106599660 A | 4/2017 |
| CN | 106875191 A | 6/2017 |
| CN | 106909821 A | 6/2017 |
| CN | 106951866 A | 7/2017 |
| CN | 107480658 A | 12/2017 |
| CN | 107679861 A | 2/2018 |
| CN | 107993073 A | 5/2018 |
| CN | 108009465 A | 5/2018 |
| CN | 108062673 A | 5/2018 |
| CN | 108280649 A | 7/2018 |
| WO | WO 2018/084170 A1 | 5/2018 |

OTHER PUBLICATIONS

Abdel-Mottaleb et al., "Human Ear Recognition from Face Profile Images", Jan. 5, 2006, International Conference on Computer Analysis of Images and Patterns. CAIP 2017: Computer Analysis of Images and Patterns, Springer, Berlin, Heidelberg, pp. 786-792.

Pissarenko, "Eigenface-based facial recognition", Dec. 1, 2002, retrieved from http://citeseerx.ist.psu.edu/viewdoc/download?doi=10.1.1.13.233&rep=rep1&type=pdf, pp. 1-6.

* cited by examiner

200

210

PAYMENT METHOD, APPARATUS, AND SYSTEM

CROSS-REFERENCE TO RELATED APPLICATIONS

This application is based upon and claims priority to Chinese Patent Application No. 201810778548.7, filed on Jul. 16, 2018, the entire content of all of which is incorporated herein by reference.

TECHNICAL FIELD

The present application relates to the field of identity recognition, and more particularly to a payment method, apparatus, and system.

BACKGROUND

With the rapid development of computer and communication technologies, people's payment modes after shopping are also constantly changing. More and more users have gradually changed their payment modes from the original cash payment, bank card payment or other methods to current online payment.

During an online payment, after a user logs in to an electronic account and before a corresponding deduction operation is performed, it is generally necessary to identify the identity of the user to verify whether the user currently making the payment is the user corresponding to the electronic account, so as to ensure the security of the electronic account of the user.

Therefore, it is necessary to provide a payment method to make user identity recognition more accurate, thus ensuring the security of users' electronic accounts.

SUMMARY

An objective of embodiments of the present application is to provide a payment method, apparatus, and system, in which a frontal face image, and a side face image from at least one side, of a to-be-identified user are acquired, then it is identified whether the to-be-identified user is an authorized user of a payment electronic account according to the frontal face image and the side face image. During identity recognition, by combining a frontal face and a side face, that is, taking the side face of a user into consideration, more feature information can be provided, thus improving the accuracy of identity recognition and the security of the user's electronic account.

In an embodiment, a payment method includes: acquiring a frontal face image, and a side face image from at least one side, of a to-be-identified user; identifying whether the to-be-identified user is an authorized user of a payment electronic account according to the frontal face image and the side face image; and making a deduction operation on the payment electronic account if it is identified that the to-be-identified user is an authorized user of the payment electronic account.

In an embodiment, a payment apparatus includes: an acquisition module configured to acquire a frontal face image, and a side face image from at least one side, of a to-be-identified user; an identification module configured to identify whether the to-be-identified user is an authorized user of a payment electronic account according to the frontal face image and the side face image; and an execution module configured to make a deduction operation on the payment electronic account if the to-be-identified user is an authorized user of the payment electronic account.

In an embodiment, a payment system includes: a client terminal device and a payment apparatus, wherein the client terminal device is provided with a frontal face image collector, at least one side face image collector, and an image collection controller; the image collection controller is configured to: when a to-be-identified user performs a payment using a payment electronic account, control the frontal face image collector and the side face image collector to simultaneously collect a frontal face image and a side face image of the to-be-identified user; the client terminal device is configured to send the frontal face image and the side face image to the payment apparatus; and the payment apparatus is configured to acquire the frontal face image and the side face image, and identify whether the to-be-identified user is an authorized user of the payment electronic account according to the frontal face image and the side face image; and make a deduction operation on the payment electronic account if the to-be-identified user is an authorized user of the payment electronic account.

In an embodiment, a payment device includes: a processor; and a memory configured to store computer-executable instructions, wherein when executing the computer-executable instructions, the processor performs: acquiring a frontal face image, and a side face image from at least one side, of a to-be-identified user; identifying whether the to-be-identified user is an authorized user of a payment electronic account according to the frontal face image and the side face image; and making a deduction operation on the payment electronic account if it is identified that the to-be-identified user is an authorized user of the payment electronic account.

In an embodiment, a storage medium configured to store computer-executable instructions that, when executed by a processor of a device, cause the device to perform: acquiring a frontal face image, and a side face image from at least one side, of a to-be-identified user; identifying whether the to-be-identified user is an authorized user of a payment electronic account according to the frontal face image and the side face image; and making a deduction operation on the payment electronic account if it is identified that the to-be-identified user is an authorized user of the payment electronic account.

According to the technical solutions provided in the embodiments, a frontal face image and a side face image, from at least one side, of a to-be-identified user are acquired, then it is identified whether the to-be-identified user is an authorized user of a payment electronic account according to the frontal face image and the side face image. During identity recognition, by combining a frontal face and a side face, that is, taking the side face of a user into consideration, more feature information can be provided, thus improving the accuracy of identity recognition and the security of the user's electronic account.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification will be described below with reference to the accompanying drawings. The described embodiments are merely exemplary rather than all embodiments consistent with the specification. All other embodiments obtained by those of ordinary skill in the art based on the described embodiments shall fall within the protection scope of the present application.

The embodiments of the specification provide a payment method. In the method, a frontal face image and a side face image of a to-be-identified user are used in combination to identify whether the to-be-identified user is an authorized user of a payment electronic account, so that the accuracy of identity recognition is improved, thereby effectively ensuring the security of the payment electronic account.

The payment method provided in the embodiments may be applied to a scenario where a user uses a client terminal device to perform a payment by using an electronic account. The client terminal device may be a terminal device such as a mobile phone or a tablet computer, or may be a vending machine. Therefore, a specific application scenario of the payment method may be performing a payment on a vending machine by using an electronic account; may be a user using a terminal device such as a mobile phone or a tablet computer to perform a payment through scanning a code; or may be a user using a terminal device such as a mobile phone or a tablet computer to perform an online payment. The several specific application scenarios are provided here by way of example only, and specific application scenarios of the payment method are not limited thereto.

Figure 1:
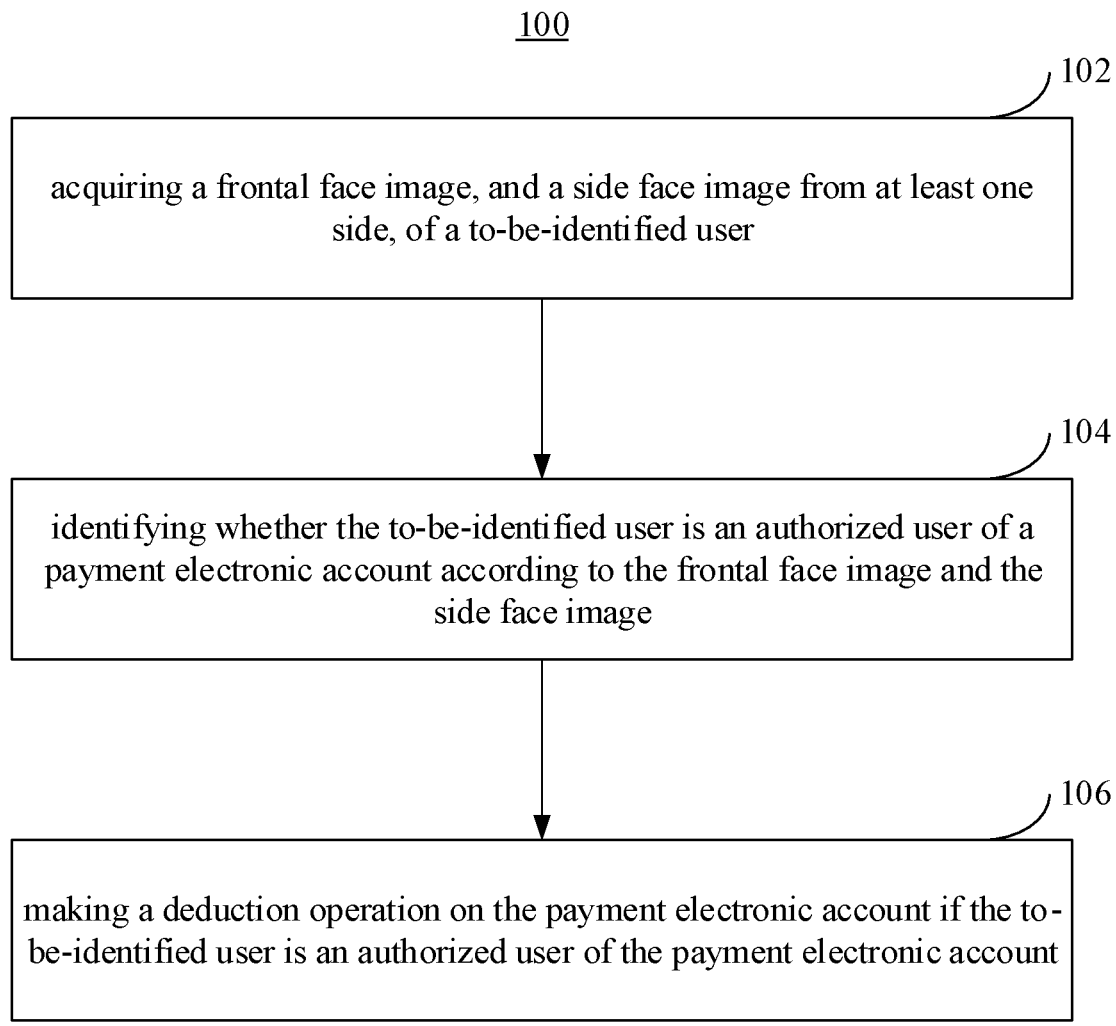
FIG. 1 is a flowchart of a payment method according to an embodiment.

FIG. 1 is a flowchart of a payment method 100 according to an embodiment. The method 100 includes the following steps.

In step 102, a frontal face image, and a side face image from at least one side, of a to-be-identified user are acquired.

The method provided in the embodiments of the present application may be applied to a server side, that is, the method is executed by a server.

Figure 2A:
FIG. 2(a) is a schematic diagram of a frontal face image in a payment method according to an embodiment.
Figure 2B:
FIG. 2(b) is a schematic diagram of a side face image in a payment method according to an embodiment.

The frontal face image refers to an image that is collected from the front of the to-be-identified user and includes the entire face of the to-be-identified user. A frontal face image 200 shown in FIG. 2(a) may be obtained when the user is photographed from the front of the user. The side face image refers to an image that is collected from one side of the to-be-identified user and includes half of the face of the to-be-identified user. A side face image 210 shown in FIG. 2(b) may be obtained when the user is photographed from one side of the user.

The to-be-identified user in step 102 refers to a user performing a payment using an electronic account. The side face image from the at least one side may include only a left-side face image; or may include only a right-side face image; or may include a left-side face image and a right-side face image. Therefore, step 102 may include the following three cases: acquiring the frontal face image and the left-side face image of the to-be-identified user; acquiring the frontal face image and the right-side face image of the to-be-identified user; and acquiring the frontal face image, the left-side face image, and the right-side face image of the to-be-identified user.

During specific implementation, whether to acquire one side face image or two side face images of the to-be-identified user and whether to acquire the left-side face image or the right-side face image when acquiring one side face image may be set according to actual application scenarios and are not limited in the embodiments of the present application.

In step 102, the server generally obtains from a client terminal device the frontal face image and the side face image of the to-be-identified user. After collecting the frontal face image and the side face image of the to-be-identified user, the client terminal device sends the collected frontal face image and side face image to the server. The client terminal device may be a terminal device such as a mobile phone or a tablet computer or may be a device such as a vending machine supporting online payments.

When the to-be-identified user performs a payment by using an electronic account, generally the user needs to log in to the electronic account. For example, the to-be-identified user may log in to the electronic account by entering a mobile phone number or account number on the client terminal device; then the client terminal device sends the received mobile phone number or account number to the server. The server searches for a corresponding electronic account according to the mobile phone number or account number. If no corresponding electronic account is found, it indicates that the to-be-identified user has not registered the electronic account or has entered incorrect information. In this case, the server prompts, via the client terminal device, the user to register the electronic account or re-enter a mobile phone number or account number. If the server finds a corresponding electronic account, the server acquires a recorded frontal face image and a recorded side face image corresponding to the electronic account, for performing subsequent steps.

In an embodiment, the to-be-identified user performs a payment after purchasing a commodity on a vending machine. In this embodiment, when performing the payment, the to-be-identified user may log in to an electronic account on the vending machine, and a frontal face image and a side face image of the to-be-identified user are collected by using an image collection device installed on the vending machine, then the collected frontal face image and side face image are sent to the server, so as to perform the payment.

In an embodiment, a frontal face image collection device and a side face image collection device may be installed at corresponding positions on the vending machine. When the face area of the to-be-identified user is placed within a set area, the frontal face image collection device and the side face image collection device are controlled to simultaneously collect a frontal face image and a side face image of the to-be-identified user. There may be one or two side face image collection devices.

In the embodiments, with the frontal face image collection device and the side face image collection device installed on the vending machine, the frontal face image and the side face image of the to-be-identified user can be collected at the same time, so that the time required for collecting face images of the to-be-identified user can be reduced, leading to simple and convenient operations.

In an embodiment, the vending machine may be equipped with only one image collection device. The to-be-identified user may respectively conduct the collection of the frontal face image and the side face image as prompted by the vending machine. For example, the to-be-identified user may place the frontal face within a set area as prompted by the vending machine to collect a frontal face image, and place a side face within a set area as prompted by the vending machine to collect a side face image. After that, the collected face images are sent to the server.

In the embodiment, when only one image collection device is installed on the vending machine for acquiring the frontal face image and the side face image of the to-be-identified user, the cost of the vending machine can be reduced.

In an embodiment, when the to-be-identified user uses a terminal device such as a mobile phone or a tablet computer to perform a payment through scanning a code after offline shopping, for example, after shopping at a vending machine or a physical store, a frontal face image and a side face image of the to-be-identified user may be collected using the terminal device, and the collected frontal face image and side face image may be sent to the server, so that the server performs a deduction operation.

In the embodiment, when the terminal device such as a mobile phone or a tablet computer is used to collect the frontal face image and the side face image of the to-be-identified user, the frontal face may be placed within a set area as prompted by the terminal device, and then a frontal face image of the to-be-identified user is collected by using a camera on the terminal device; then, the side face is placed within a set area as prompted by the terminal device, so as to collect a side face image by using a camera on the terminal device. After the collection is complete, the terminal device sends the collected frontal face image and side face image to the server.

If the user performs online shopping and uses a terminal device such as a mobile phone or a tablet computer to perform an online payment, the method for collecting the frontal face image and the side face image may be the same as that for the application scenario where the terminal device performs a payment through scanning after offline shopping. The foregoing embodiments can be referred to for the specific process, which will not be repeated here.

In addition, in the embodiments, when instructing the to-be-identified user to place the frontal face within the set area and place the side face within the set area, a contour area of the frontal face or the side face may be displayed on a display, so that the to-be-identified user adjusts the posture and the position of the frontal face or the side face according to the contour area.

In an embodiment, during the collection of the side face image, to collect as many facial features as possible, the image collection device is placed exactly facing the left side face as much as possible.

Because the images sent by the client terminal device to the server include the frontal face image and the side face image of the to-be-identified user, the client terminal device, after collecting the frontal face image and the side face image of the to-be-identified user, may respectively label the frontal face image and the side face image, so that the server can distinguish the frontal face image from the side face image.

In step 104, whether the to-be-identified user is an authorized user of a payment electronic account is identified according to the frontal face image and the side face image.

The authorized user may be an owner of the payment electronic account or may be another user authorized by the owner of the electronic account to use the electronic account.

For example, in step 104, the identifying whether the to-be-identified user is an authorized user of a payment electronic account according to the frontal face image and the side face image may include the following steps (1) and (2).

In step (1), a similarity comparison between the frontal face image and a recorded frontal face image corresponding to the payment electronic account is performed to obtain a frontal face similarity, and a similarity comparison between the side face image and a recorded side face image corresponding to the payment electronic account is performed to obtain a side face similarity.

The recorded frontal face image and the recorded side face image are prestored face images of an authorized user of the electronic account.

In step (1), the similarity comparison between the frontal face image and the recorded frontal face image corresponding to the payment electronic account may be implemented through the following processes:

Key points on the frontal face image are detected by using a pre-trained key point detection model. In a specific implementation, the key points may be the eyes, the tip of nose, the lip, or the eyebrows of the to-be-identified user. After the key points on the frontal face image are detected, the frontal face image is calibrated according to the positions of the key points. For example, the face may be crooked and different from the posture of the face in the prestored recorded frontal face image. In this case, the posture of the face in the frontal face image may be adjusted through affine transformation according to the key points, and the frontal face image may further be zoomed, stretched, or rotated, so that the adjusted frontal face image is of the same size as that of the recorded frontal face image, and the postures of the faces in the two images are the same.

Then, a convolution operation is performed on the adjusted frontal face image by using a convolutional neural network, and a first frontal face feature vector of the to-be-identified user is calculated. In addition, if a database directly stores a second frontal face feature vector corresponding to the recorded frontal face image, the second frontal face feature vector corresponding to the payment electronic account is directly acquired from the database; if the database stores only the recorded frontal face image, a convolution operation is performed on the recorded frontal face image by using the convolutional neural network, to obtain the second frontal face feature vector corresponding to the payment electronic account.

Finally, a Euclidean distance between the first frontal face feature vector and the second feature vector is calculated, and the Euclidean distance is determined as the similarity between the frontal face image of the to-be-identified user and the recorded frontal face image. For example, traditional methods for calculating a Euclidean distance between two vectors may be used.

In an embodiment, in step (1), the performing a similarity comparison between the side face image and a recorded side face image corresponding to the payment electronic account includes the following step (A), step (B), step (C), and (D):

Step (A): adjusting the side face image to obtain a standard side face image, wherein the standard side face image is of a specified size, and the side face in the standard side face image has a specified posture;

Step (B): extracting a first side face feature vector of the to-be-identified user according to the standard side face image;

Step (C): acquiring a second side face feature vector corresponding to the recorded side face image; and Step (D): calculating a similarity between the side face image and the recorded side face image based on the first side face feature vector and the second side face feature vector.

The following describes in detail a specific implementation process of each of the four steps.

In step (A), the adjusting the side face image to obtain a standard side face image includes: determining positions of key points on the side face image, wherein the key points at least include an ear hole center and a tip of nose; and adjusting the side face image based on a position of the ear hole center on the side face image, a position of the tip of nose on the side face image, and relative positions of the ear hole center and the tip of nose, to obtain the standard side face image.

Before the payment method 100 is performed, side face images of a large number of users may be collected. Then, key points on the side face images are manually marked, the side face images with the marked key points are used as training samples, and then a key point detection model is obtained through training with a convolutional neural network (CNN).

In an embodiment, a feature vector of each key point may be trained by using the convolutional neural network, to obtain the key point detection model. During key point detection, matching may be performed between a feature vector of each area on the side face image and the feature vector of each key point, to determine a position of each key point on the side face image.

In the embodiments, training of a key point detection model and key point detection of the side face image may be the same as those of the frontal face image, except that different key points are selected.

Therefore, in step (A), each key point on the side face image may be detected by using the key point detection model obtained through training, and each key point is marked on the side face image.

Figure 3A:
FIG. 3(a) is a schematic diagram of key points on a side face image in a payment method according to an embodiment.

FIG. 3(a) is a schematic diagram of key points on a side face image 300 in a payment method according to an embodiment. For example, the key points used may be the ear hole center 310, the midpoint between eyebrows 312, the tip of nose 314, the chin tip 316, and the face bite joint junction 318. Exemplary positions of the key points on the side face are as shown in FIG. 3(a). The key points selected on the side face image may also be others, and this is merely an example for description.

After the position of each key point on the side face image is determined, the side face image may be calibrated by using any two or more of the key points.

A specific process of adjusting the side face image to obtain the standard side face image is described below by using an example where the side face image is adjusted according to two key points, which are the ear hole center and the tip of nose.

Figure 3B:
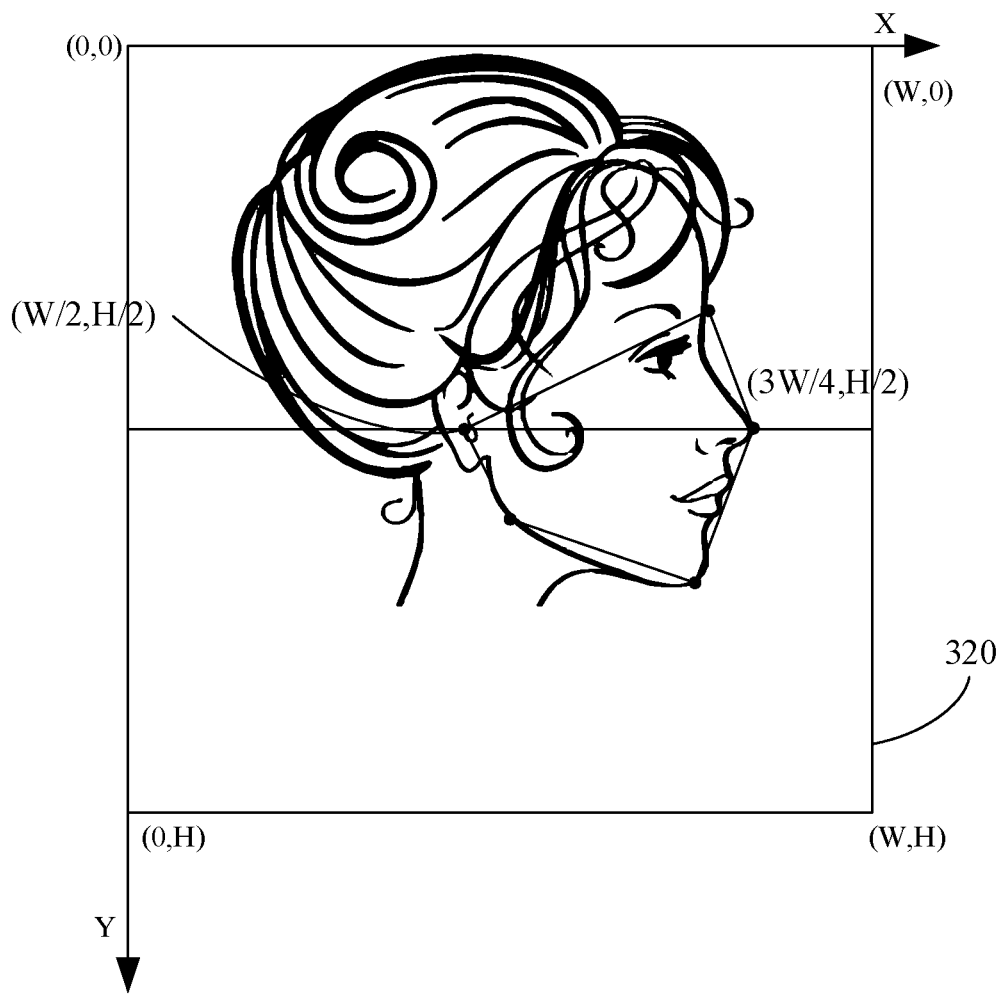
FIG. 3(b) is a schematic diagram of a standard side face image obtained after adjustment in a payment method according to an embodiment.

First, a coordinate system is built by using the upper left corner of the side face image as an origin, using the horizontal side as a horizontal axis, and using the vertical side face as a vertical axis. The side face image is compressed, stretched, cropped or otherwise processed so that coordinates of the ear hole center in the coordinate system are (W/2, H/2), that is, the ear hole center is located at the center of the side face image, wherein W represents a length of the side face image, and H represents a height of the side face image. Then, the side face image is rotated by using the ear hole center as the center, until a line connecting the ear hole center and the tip of nose is parallel to the horizontal axis in the coordinate system. Finally, the side face image is compressed or stretched again, so that coordinates of the tip of nose in the coordinate system are (3W/4, H/2). A standard side face image 320 obtained after the adjustment is as shown in FIG. 3(b).

The above description merely provides a specific implementation of adjustment of the side face image, and the side face image may also be adjusted by using other key points. The standard side face image is not limited to a particular form and may also be in other forms.

The purpose of adjusting the side face image is to make the side face image have the same size as the recorded side face image and make the postures of the faces in the two images be consistent. That is, in the embodiments, the recorded side face image is stored in the form of a standard side face image. During the similarity comparison for the side face image, the purpose of adjusting the side face image to have the same size and posture as the recorded side face image is to increase the accuracy of similarity comparison for the side face.

In step (B), after the standard side face image is obtained, the side face image needs to be processed, and a convolution operation is performed on the standard side face image by using the convolutional neural network, to obtain the first side face feature vector of the side face image.

In the embodiments, the database may have only a recorded side face image corresponding to an authorized user of the payment electronic account prestored therein. The recorded side face image is stored in the form of a standard side face image. Therefore, in step (C), a convolution operation may be performed on the recorded side face image by using the convolutional neural network, to extract the second side face feature vector. Alternatively, the second side face feature vector corresponding to the recorded side face image may be acquired in advance, and the second side face feature vector and the recorded side face image are stored together in the database. In this case, in step (C), the second side face feature vector can be simply acquired from the database.

In step (D), the calculating a similarity between the side face image and the recorded side face image based on the first side face feature vector and the second side face feature vector may include: calculating a Euclidean distance between the first side face feature vector and the second side face feature vector; and determining the Euclidean distance as the similarity between the side face image and the recorded side face image.

As described above, step 104 may include steps (1) and (2). In step (2), whether the to-be-identified user is an authorized user of the payment electronic account is identified according to the frontal face similarity and the side face similarity.

In an embodiment, in step (2), the identifying whether the to-be-identified user is an authorized user of the payment electronic account according to the frontal face similarity and the side face similarity includes: if the frontal face similarity is greater than a first set threshold and the side face similarity is greater than a second set threshold, determining that the to-be-identified user is an authorized user of the payment electronic account.

The first set threshold and the second set threshold are similarity values set according to actual application scenarios. For example, the first set threshold may be 95%, and the second set threshold may be 90%. This is merely an example for description. Specific values of the first set threshold and the second set threshold are not limited thereto, the specific values of the first set threshold and the second set threshold are not limited in the embodiments of the present application, and the specific values of the first set threshold and the second set threshold may be set according to actual application scenarios. In addition, the first set threshold and the second set threshold may have the same or different values.

In the embodiments, after the similarity comparison is performed between the frontal face image and the recorded frontal face image and between the side face image and the recorded side face image, the frontal face similarity is compared with the first set threshold, and the side face similarity is compared with the second set threshold. If the frontal face similarity is greater than the first set threshold, and the side face similarity is greater than the second set threshold, it is considered that the to-be-identified user is identified, that is, it can be determined that the to-be-identified user is an authorized user of the payment electronic account.

In step 106, a deduction operation is made on the payment electronic account if the to-be-identified user is an authorized user of the payment electronic account.

In an embodiment, before it is identified whether the to-be-identified user is an authorized user of the payment electronic account, the user has already acquired a payment amount. The payment amount may be entered by the to-be-identified user through the client terminal device or may be directly acquired from commodity information when the user purchases a commodity.

Therefore, after it is identified that the to-be-identified user is an authorized user of the payment electronic account, a deduction operation is directly performed on the payment electronic account.

Figure 4:
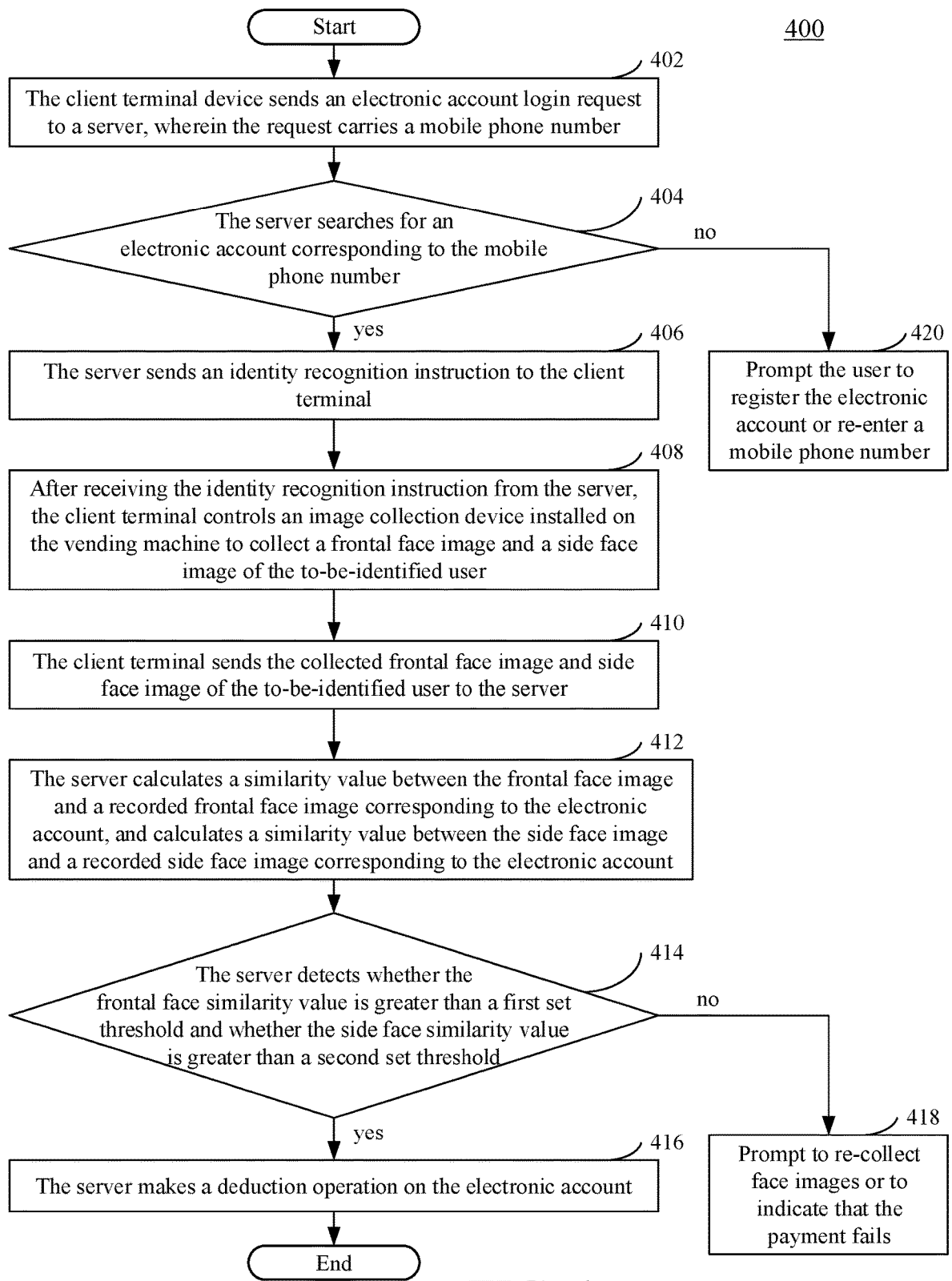
FIG. 4 is a flowchart of a payment method according to an embodiment.

FIG. 4 is a flowchart of a payment method 400 according to an embodiment. In the embodiment, a user purchases a commodity on a vending machine and performs a payment, and a client terminal device is installed on the vending machine. The method 400 includes the following steps.

In step 402, the client terminal device sends an electronic account login request to a server, wherein the request carries a mobile phone number.

When the user selects a commodity on the vending machine and performs a payment, the user sends an electronic account login request to the server via the client terminal device installed on the vending machine.

In step 404, the server searches for an electronic account corresponding to the mobile phone number. If the electronic account is found, step 406 is performed; otherwise, step 420 is performed;

In step 406, the server sends an identity recognition instruction to the client terminal.

In step 408, after receiving the identity recognition instruction from the server, the client terminal controls an image collection device installed on the vending machine to collect a frontal face image and a side face image of the to-be-identified user.

One image collection device may be installed on the vending machine to collect the frontal face image and the side face image of the to-be-identified user. Alternatively, a frontal face image collection device and a side face image collection device may be installed at corresponding positions on the vending machine. The client terminal controls the frontal face image collection device and the side face image collection device to simultaneously collect the frontal face image and the side face image of the to-be-identified user.

In step 410, the client terminal sends the collected frontal face image and side face image of the to-be-identified user to the server.

In step 412, the server calculates a frontal face similarity value between the frontal face image and a recorded frontal face image corresponding to the electronic account and calculates a side face similarity value between the side face image and a recorded side face image corresponding to the electronic account.

In step 414, the server detects whether the frontal face similarity value is greater than a first set threshold and whether the side face similarity value is greater than a second set threshold. If yes, step 416 is performed; otherwise, step 418 is performed.

In step 416, the server makes a deduction operation on the electronic account.

In step 418, the client terminal prompts to re-collect face images or to indicate that the payment fails.

In step 420, the client terminal prompts the user to register the electronic account or re-enter a mobile phone number.

Specific implementation processes of the steps in the embodiment shown in FIG. 4 are the same as those of the steps in the embodiments shown in FIG. 1 to FIG. 3(*b*). The foregoing embodiments can be referred to for details, which will not be repeated here.

Figure 5:
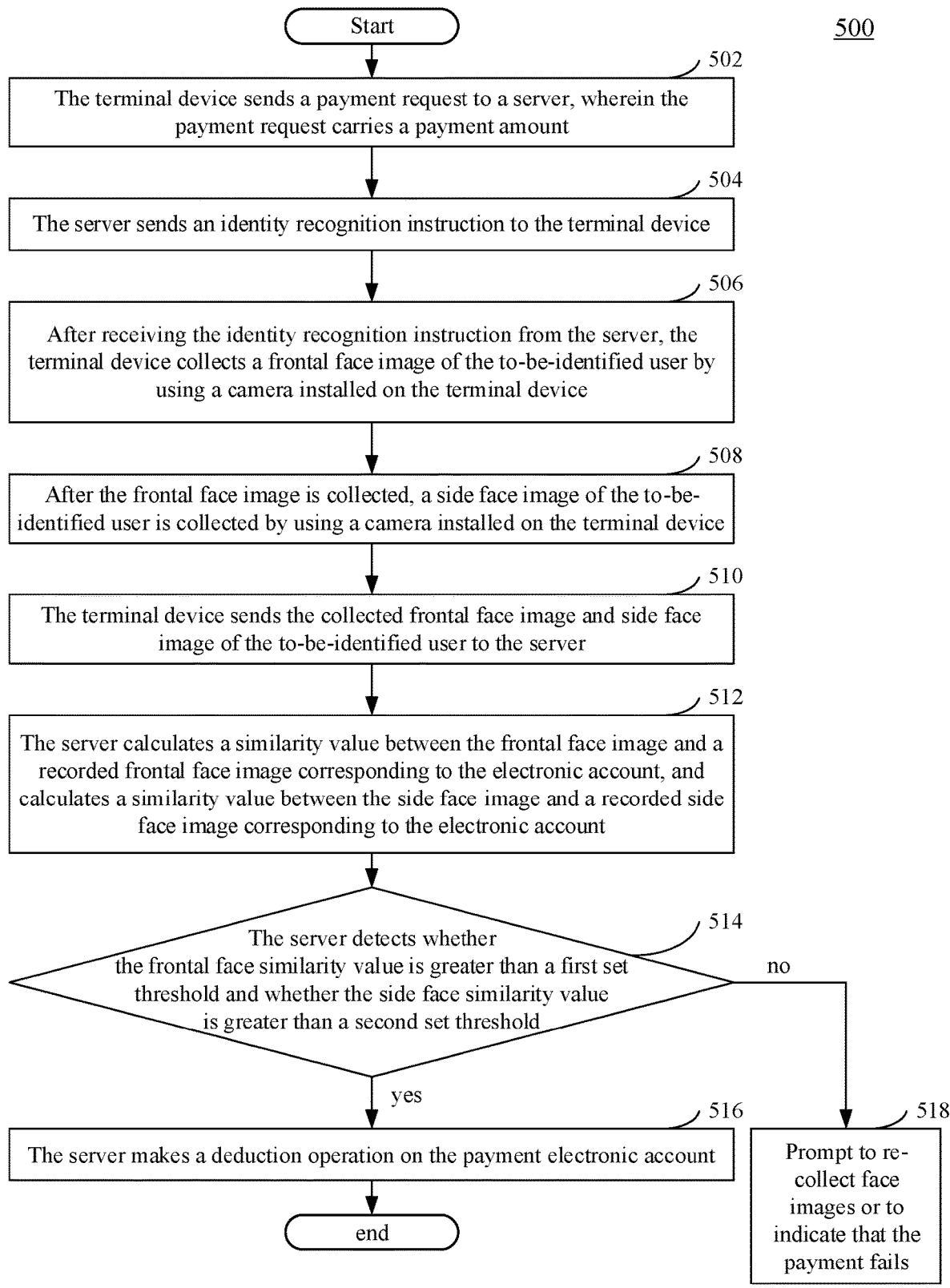
FIG. 5 is a flowchart of a payment method according to an embodiment.

FIG. 5 is a flowchart of a payment method 500 according to an embodiment. In the embodiment, a user purchases a commodity and uses a terminal device such as a mobile phone or a tablet computer to perform a payment. The method 500 includes the following steps:

In step 502, the terminal device sends a payment request to a server, wherein the payment request carries a payment amount.

After the user purchases a commodity offline or online, the user opens a payment application installed on the terminal device to perform a payment.

In step 504, the server sends an identity recognition instruction to the terminal device.

In step 506, after receiving the identity recognition instruction from the server, the terminal device collects a frontal face image of the to-be-identified user by using a camera installed on the terminal device.

In an embodiment, in step 506, a frontal face contour may be displayed on a display of the terminal device, the to-be-identified user is prompted to place the frontal face within the frontal face contour area, and after the to-be-identified user places the frontal face within the area, a frontal face image of the to-be-identified user is collected by using the camera.

In step 508, after the frontal face image is collected, a side face image of the to-be-identified user is collected by using a camera installed on the terminal device.

In an embodiment, in step 508, a side face contour may be displayed on the display of the terminal device, the to-be-identified user is prompted to place the side face within the side face contour area, and after the to-be-identified user places the side face within the area, a side face image of the to-be-identified user is collected by using the camera.

In step 510, the terminal device sends the collected frontal face image and side face image of the to-be-identified user to the server.

In step 512, the server calculates a frontal face similarity value between the frontal face image and a recorded frontal face image corresponding to the electronic account and calculates a side face similarity value between the side face image and a recorded side face image corresponding to the electronic account.

In step 514, the server detects whether the frontal face similarity value is greater than a first set threshold and whether the side face similarity value is greater than a second set threshold. If yes, step 516 is performed; otherwise, step 518 is performed.

In step 516, the server makes a deduction operation on the payment electronic account.

In step 518, the terminal device prompts to re-collect face images or to indicate that the payment fails.

Specific implementation processes of the steps in the embodiment shown in FIG. 5 may be the same as those of the steps in the embodiments shown in FIG. 1 to FIG. 3(b). The foregoing embodiments can be referred to for details, which will not be repeated here.

In the embodiments, a frontal face image and a side face image, from at least one side, of a to-be-identified user are acquired, then it is identified whether the to-be-identified user is an authorized user of a payment electronic account according to the frontal face image and the side face image. During identity recognition, by combining a frontal face and a side face, that is, taking the side face of a user into consideration, more feature information can be provided, thus improving the accuracy of identity recognition and the security of the user's electronic account.

Figure 6:
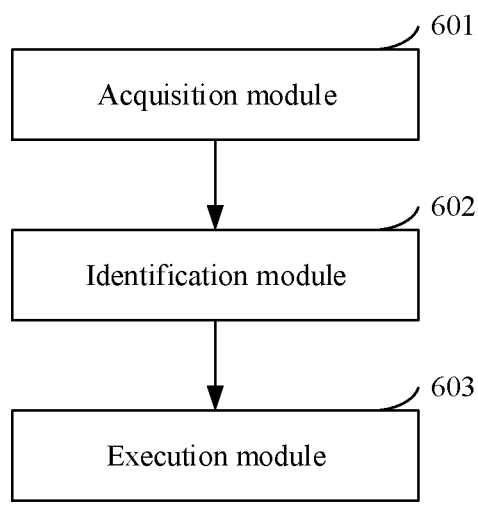
FIG. 6 is a block diagram of a payment apparatus according to an embodiment.

FIG. 6 is a block diagram of a payment apparatus 600 according to an embodiment. The apparatus 600 includes: an acquisition module 601 configured to acquire a frontal face image, and a side face image from at least one side, of a to-be-identified user; an identification module 602 configured to identify whether the to-be-identified user is an authorized user of a payment electronic account according to the frontal face image and the side face image; and an execution module 603 configured to make a deduction operation on the payment electronic account if the to-be-identified user is an authorized user of the payment electronic account.

In an embodiment, the identification module 602 includes: a comparison unit configured to perform a similarity comparison between the frontal face image and a recorded frontal face image corresponding to the payment electronic account, and perform a similarity comparison between the side face image and a recorded side face image corresponding to the payment electronic account; and an identification unit configured to identify whether the to-be-identified user is an authorized user of the payment electronic account according to the frontal face similarity and the side face similarity.

In an embodiment, the comparison unit includes: an adjustment subunit configured to adjust the side face image to obtain a standard side face image, wherein the standard side face image is of a specified size, and the side face in the standard side face image has a specified posture; an extraction subunit configured to extract a first side face feature vector of the to-be-identified user according to the standard side face image; an acquisition subunit configured to acquire a second side face feature vector corresponding to the recorded side face image; and a calculation subunit configured to calculate a similarity between the side face image and the recorded side face image based on the first side face feature vector and the second side face feature vector.

In an embodiment, the adjustment subunit is configured to determine positions of key points on the side face image, wherein the key points at least include an ear hole center and a tip of nose; and adjust the side face image based on a position of the ear hole center on the side face image, a position of the tip of nose on the side face image, and relative positions of the ear hole center and the tip of nose, to obtain the standard side face image.

In an embodiment, the calculation subunit is configured to calculate a Euclidean distance between the first side face feature vector and the second side face feature vector; and determine the Euclidean distance as the similarity between the side face image and the recorded side face image.

In an embodiment, the identification unit includes: a determination subunit configured to: if the frontal face similarity is greater than a first set threshold and the side face similarity is greater than a second set threshold, determine that the to-be-identified user is an authorized user of the payment electronic account.

The payment apparatus 600 corresponds to the payment method illustrated in FIG. 1 to FIG. 5. The foregoing method embodiments can be referred to for specific implementation processes of the modules, which will not be repeated here.

According to the payment apparatus 600, a frontal face image and a side face image, from at least one side, of a to-be-identified user are acquired, then it is identified whether the to-be-identified user is an authorized user of a payment electronic account according to a combination of the frontal face image and the side face image, and if the to-be-identified user is an authorized user of the payment electronic account, the payment electronic account is controlled to perform a deduction operation. By combining a frontal face and a side face, the accuracy of identity recognition is improved, thus improving the security of the user's electronic account.

Figure 7:
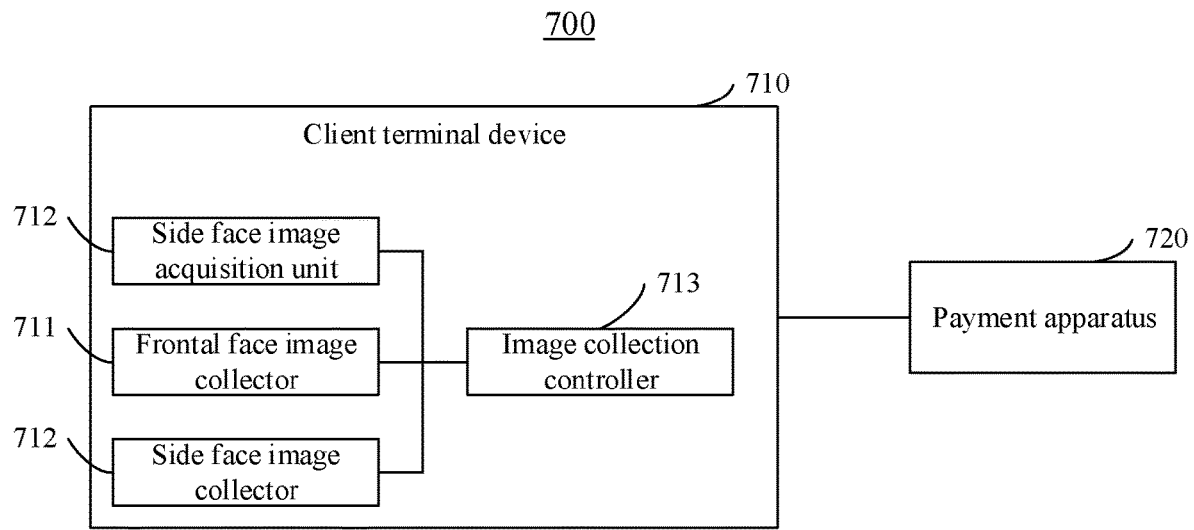
FIG. 7 is a block diagram of a payment system according to an embodiment.

FIG. 7 is a schematic diagram of a payment system 700 according to an embodiment. The payment methods described above can be referred to for specific implementation of modules and components of the payment system 700, which includes a client terminal device 710 and a payment apparatus 720.

The client terminal device 710 includes a frontal face image collector 711, at least one side face image collector 712, and an image collection controller 713.

The image collection controller 713 is configured to: when a to-be-identified user performs a payment using a payment electronic account, control the frontal face image collector 711 and the side face image collector 712 to simultaneously collect a frontal face image and a side face image of the to-be-identified user.

The client terminal device 710 is configured to send the frontal face image and the side face image to the payment apparatus.

The payment apparatus 720 is configured to acquire the frontal face image and the side face image, and identify whether the to-be-identified user is an authorized user of the payment electronic account according to the frontal face image and the side face image; and make a deduction operation on the payment electronic account if the to-be-identified user is an authorized user of the payment electronic account.

In the payment system 700, a case involving two side face image collectors, that is, the left-side face image collector and the right-side face image collector, is described. However, the quantity of side face image collectors is not limited thereto.

In an embodiment, the payment apparatus 720 is configured to: perform a similarity comparison between the frontal face image and a recorded frontal face image corresponding to the payment electronic account, and perform a similarity comparison between the side face image and a recorded side face image corresponding to the payment electronic account; and identify whether the to-be-identified user is an authorized user of the payment electronic account according to the frontal face similarity and the side face similarity.

In an embodiment, the payment apparatus 720 is further configured to: adjust the side face image to obtain a standard side face image, wherein the standard side face image is of a specified size, and the side face in the standard side face image has a specified posture; extract a first side face feature vector of the to-be-identified user according to the standard side face image; acquire a second side face feature vector corresponding to the recorded side face image; and calculate a similarity between the side face image and the recorded side face image based on the first side face feature vector and the second side face feature vector.

In an embodiment, the payment apparatus 720 is further configured to: determine positions of key points on the side face image, wherein the key points at least include an ear hole center and a tip of nose; and adjust the side face image based on a position of the ear hole center on the side face image, a position of the tip of nose on the side face image, and relative positions of the ear hole center and the tip of nose, to obtain the standard side face image.

In an embodiment, the payment apparatus 720 is further configured to: calculate a Euclidean distance between the first side face feature vector and the second side face feature vector; and determine the Euclidean distance as the similarity between the side face image and the recorded side face image.

In an embodiment, the payment apparatus 720 is further configured to: if the frontal face similarity is greater than a first set threshold and the side face similarity is greater than a second set threshold, determine that the to-be-identified user is an authorized user of the payment electronic account.

Figure 8:
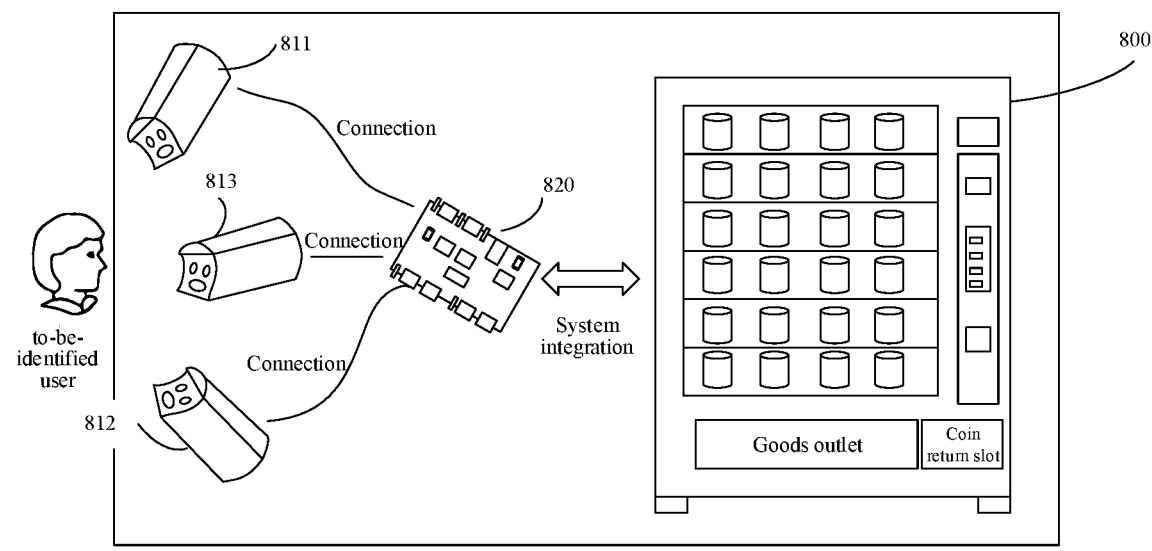
FIG. 8 is a schematic diagram of a payment system according to an embodiment.

FIG. 8 is a schematic diagram of an image collection device installed on a vending machine 800 in a payment system according to an embodiment. In the embodiment, the image collection device includes three image collectors: a left-side face image collector 811, a right-side face image collector 812, and a frontal face image collector 813. For example, the frontal face image collector 813 is disposed in the middle, the left-side face image collector 811 is disposed on the left side of the frontal face image collector 813, and the right-side face image collector 812 is disposed on the right side of the frontal face image collector 813.

In an embodiment, the left-side face image collector 811, the frontal face image collector 813, and the right-side face image collector 812 may be cameras, and the three image collectors need to be connected to an image collection controller 820, so that the image collection controller 820 controls the three image collectors to simultaneously collect face images of the to-be-identified user.

In an embodiment, the left-side face image collector 811, the right-side face image collector 812, the frontal face image collector 813, and the image collection controller 820 are integrated on the vending machine 800 including a payment client terminal installed thereon, to obtain a particular payment system. The image collection controller 820 may be a control circuit board.

When the system in FIG. 8 is used to perform a payment, generally a user's face faces the frontal face image collector.

According to the payment system provided in the embodiments, a frontal face image and a side face image, from at least one side, of a to-be-identified user are acquired, then it is identified whether the to-be-identified user is an authorized user of a payment electronic account according to the frontal face image and the side face image. During identity recognition, by combining a frontal face and a side face, that is, taking the side face of a user into consideration, more feature information can be provided, thus improving the accuracy of identity recognition and the security of the user's electronic account.

Figure 9:
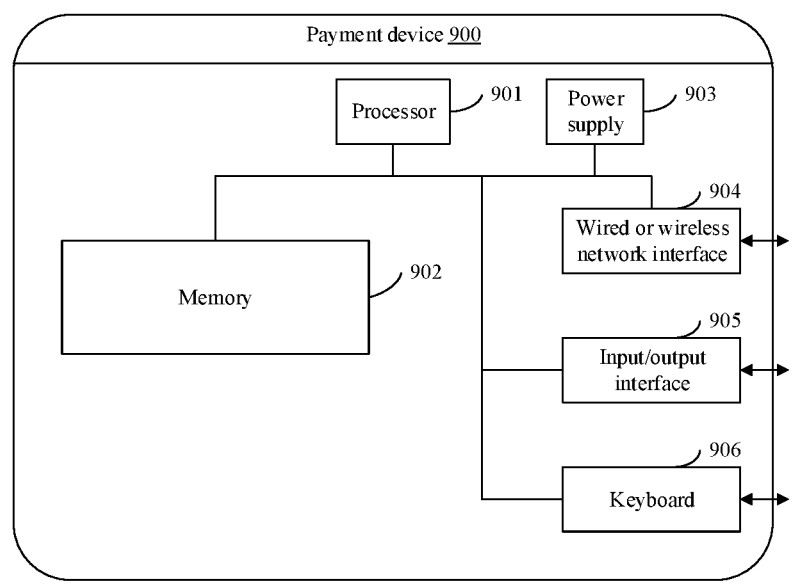
FIG. 9 is a schematic diagram of a payment device according to an embodiment.

Further, based on the payment methods illustrated in FIG. 1 to FIG. 5, embodiments of the specification further provide a payment device 900, as shown in FIG. 9.

The payment device 900 may vary greatly depending on different configurations or performance and may include one or more processors 901 and a memory 902.

The one or more processors 901 may include one or more dedicated processing units, application-specific integrated circuits (ASICs), field-programmable gate arrays (FPGAs), or various other types of processors or processing units. The one or more processors 901 are coupled with the memory 902 and configured to execute instructions stored in the memory 902 to perform the above described methods.

The memory 902 may include a permanent memory, a non-permanent memory, a random access memory (RAM) and/or a non-volatile memory (such as a read-only memory (ROM) or a flash memory (flash RAM)), etc.

The memory 902 may store one or more storage application programs or data. The memory 902 may be a transient or persistent storage. The application programs stored in the memory 902 may include one or more modules (not shown), wherein each module may include a series of computer-executable instructions in the payment device. Still further, the processor 901 may be configured to communicate with the memory 902, and execute, on the payment device, the series of computer-executable instructions in the memory 902. The payment device may further include one or more power supplies 903, one or more wired or wireless network interfaces 904, one or more input/output interfaces 905, and one or more keyboards 906.

In an embodiment, one or more programs are stored in the memory 902. The one or more programs may include one or more modules, and each module may include a series of computer-executable instructions for the payment device 900. The one or more processors 901 are configured to execute the one or more programs to perform: acquiring a frontal face image, and a side face image from at least one side, of a to-be-identified user; identifying whether the to-be-identified user is an authorized user of a payment electronic account according to the frontal face image and the side face image; and making a deduction operation on the payment electronic account if it is identified that the to-be-identified user is an authorized user of the payment electronic account.

In an embodiment, in identifying whether the to-be-identified user is an authorized user of a payment electronic account according to the frontal face image and the side face image, the one or more processors 901 are configured to execute the one or more programs to: perform a similarity comparison between the frontal face image and a recorded frontal face image corresponding to the payment electronic account, and perform a similarity comparison between the side face image and a recorded side face image corresponding to the payment electronic account; and identify whether the to-be-identified user is an authorized user of the payment electronic account according to the frontal face similarity and the side face similarity.

In an embodiment, in performing a similarity comparison between the side face image and a recorded side face image corresponding to the payment electronic account, the one or more processors 901 are configured to execute the one or more programs to: adjust the side face image to obtain a standard side face image, wherein the standard side face image is of a specified size, and the side face in the standard side face image has a specified posture; extract a first side face feature vector of the to-be-identified user according to the standard side face image; acquire a second side face feature vector corresponding to the recorded side face image; and calculate a similarity between the side face image and the recorded side face image based on the first side face feature vector and the second side face feature vector.

In an embodiment, in adjusting the side face image to obtain a standard side face image, the one or more processors 901 are configured to execute the one or more programs to: determine positions of key points on the side face image, wherein the key points at least include an ear hole center and a tip of nose; and adjust the side face image based on a position of the ear hole center on the side face image, a position of the tip of nose on the side face image, and relative positions of the ear hole center and the tip of nose, to obtain the standard side face image.

In an embodiment, in calculating a similarity between the side face image and the recorded side face image based on the first side face feature vector and the second side face feature vector, the one or more processors 901 are configured to execute the one or more programs to: calculate a Euclidean distance between the first side face feature vector and the second side face feature vector; and determine the Euclidean distance as the similarity between the side face image and the recorded side face image.

In an embodiment, in identifying whether the to-be-identified user is an authorized user of the payment electronic account according to the frontal face similarity and the side face similarity, the one or more processors 901 are configured to execute the one or more programs to: if the frontal face similarity is greater than a first set threshold and the side face similarity is greater than a second set threshold, determine that the to-be-identified user is an authorized user of the payment electronic account.

According to the payment device 900, a frontal face image and a side face image, from at least one side, of a to-be-identified user are acquired, then it is identified whether the to-be-identified user is an authorized user of a payment electronic account according to the frontal face image and the side face image. During identity recognition, by combining a frontal face and a side face, that is, taking the side face of a user into consideration, more feature information can be provided, thus improving the accuracy of identity recognition and the security of the user's electronic account.

Further, based on the methods illustrated in FIG. 1 to FIG. 5, embodiments of the specification further provide a storage medium, which is configured to store computer-executable instructions. The storage medium may be, e.g., a USB flash drive, an optical disc, or a hard disk. When the computer-executable instructions stored in the storage medium are executed by a processor, the following operations are performed: acquiring a frontal face image, and a side face image from at least one side, of a to-be-identified user; identifying whether the to-be-identified user is an authorized user of a payment electronic account according to the frontal face image and the side face image; and making a deduction operation on the payment electronic account if it is identified that the to-be-identified user is an authorized user of the payment electronic account.

In an embodiment, when the computer-executable instructions stored in the storage medium are executed by the processor, the identifying whether the to-be-identified user is an authorized user of a payment electronic account according to the frontal face image and the side face image includes: performing a similarity comparison between the frontal face image and a recorded frontal face image corresponding to the payment electronic account, and performing a similarity comparison between the side face image and a recorded side face image corresponding to the payment electronic account; and identifying whether the to-be-identified user is an authorized user of the payment electronic account according to the frontal face similarity and the side face similarity.

In an embodiment, when the computer-executable instructions stored in the storage medium are executed by the processor, the performing a similarity comparison between the side face image and a recorded side face image corresponding to the payment electronic account includes: adjusting the side face image to obtain a standard side face image, wherein the standard side face image is of a specified size, and the side face in the standard side face image has a specified posture; extracting a first side face feature vector of the to-be-identified user according to the standard side face image; acquiring a second side face feature vector corresponding to the recorded side face image; and calculating a similarity between the side face image and the recorded side face image based on the first side face feature vector and the second side face feature vector.

In an embodiment, when the computer-executable instructions stored in the storage medium are executed by the processor, the adjusting the side face image to obtain a standard side face image includes: determining positions of key points on the side face image, wherein the key points at least include an ear hole center and a tip of nose; and adjusting the side face image based on a position of the ear hole center on the side face image, a position of the tip of nose on the side face image, and relative positions of the ear hole center and the tip of nose, to obtain the standard side face image.

In an embodiment, when the computer-executable instructions stored in the storage medium are executed by the processor, the calculating a similarity between the side face image and the recorded side face image based on the first side face feature vector and the second side face feature vector includes: calculating a Euclidean distance between the first side face feature vector and the second side face feature vector; and determining the Euclidean distance as the similarity between the side face image and the recorded side face image.

In an embodiment, when the computer-executable instructions stored in the storage medium are executed by the processor, the identifying whether the to-be-identified user is an authorized user of the payment electronic account according to the frontal face similarity and the side face similarity includes: if the frontal face similarity is greater than a first set threshold and the side face similarity is greater than a second set threshold, determining that the to-be-identified user is an authorized user of the payment electronic account.

When the computer-executable instructions stored in the storage medium provided in the embodiments are executed by the processor, a frontal face image and a side face image, from at least one side, of a to-be-identified user are acquired, then it is identified whether the to-be-identified user is an authorized user of a payment electronic account according to the frontal face image and the side face image. During identity recognition, by combining a frontal face and a side face, that is, taking the side face of a user into consideration, more feature information can be provided, thus improving the accuracy of identity recognition and the security of the user's electronic account.

Each of the above described methods, modules, and units may be implemented as software, or hardware, or a combination of software and hardware. For example, a Programmable Logic Device (PLD) (for example, a Field Programmable Gate Array (FPGA)) is such an integrated circuit whose logic functions are determined by a user programming device. Designers program by themselves to "integrate" a digital system into a piece of PLD, without having a chip manufacturer to design and manufacture a dedicated integrated circuit chip. Moreover, at present, the programming is mostly implemented by using "logic compiler" software, instead of manually manufacturing an integrated circuit chip. The software is similar to a software complier for developing and writing a program, and original codes before compiling also need to be written in a specific programming language, which is referred to as a Hardware Description Language (HDL). There are not just one, but many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art also should know that a hardware circuit for implementing the logic method procedure may be easily obtained only by slightly logically programming the method procedure using the above several hardware description languages and programming the method procedure into an integrated circuit.

A controller may be implemented in any suitable manner in the above described devices. For example, the controller may be in the form of, for example, a microprocessor or a processor and a computer-readable medium storing a computer-readable program code (for example, software or firmware) executable by the (micro)processor, a logic gate, a switch, an Application Specific Integrated Circuit (ASIC), a programmable logic controller, and an embedded microcontroller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory. Those skilled in the art also know that, in addition to implementing the controller by using pure computer-readable program codes, the method steps may be logically programmed to enable the controller to implement the same function in the form of a logic gate, a switch, an application-specific integrated circuit, a programmable logic controller and an embedded microcontroller. Therefore, this type of controller may be considered as a hardware component, and apparatuses included therein for implementing various functions may also be considered as structures inside the hardware component. Or, the apparatuses used for implementing various functions may even be considered as both software modules for implementing the method and structures inside the hardware component.

The system, apparatus, module or unit illustrated in the above embodiments may be specifically implemented by using a computer chip or an entity, or a product having a certain function. A typical implementation device is a computer. The computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the above apparatus is divided into various modules/units based on functions. In an embodiment, functions of various modules/units may be implemented in the same or multiple pieces of software and/or hardware.

As will be appreciated by those skilled in the art, the embodiments of the specification may be embodied as a method, a system, or a computer program product. Accordingly, the present application may use the form of an entirely hardware embodiment, an entirely software embodiment or an embodiment combining software and hardware aspects. Furthermore, the present application may use the form of a computer program product implemented on one or more computer-usable storage media (including but not limited to magnetic disk memories, CD-ROMs, optical memories, etc.) including computer-usable program code.

The present application is described with reference to flowcharts and/or block diagrams of the method, device (system) and computer program product in the embodiments of the present application. It should be understood that a computer program instruction may be used to implement each process and/or block in the flowcharts and/or block diagrams and a combination of processes and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more processes in the flowcharts and/or one or more blocks in the block diagrams is generated by using instructions executed by the computer or the processor of another programmable data processing device.

These computer program instructions may also be stored in a computer-readable memory that may guide a computer or another programmable data processing device to work in a specified manner, so that the instructions stored in the computer-readable memory generate a product including an instruction apparatus, wherein the instruction apparatus implements functions specified in one or more processes in the flowcharts and/or in one or more blocks in the block diagrams.

These computer program instructions may also be loaded onto a computer or another programmable data processing device, so that a series of operation steps are performed on the computer or another programmable data processing device to generate computer-implemented processing, and instructions executed on the computer or another programmable data processing device provide steps for implementing functions specified in one or more processes in the flowcharts and/or one or more blocks in the block diagrams.

The computer-readable medium includes permanent and non-permanent, movable and non-movable media, and may use any method or technology to store information. The information may be a computer-readable instruction, a data structure, a module of a program or other data. Examples of storage media of the computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which may be used for storing computer accessible information. According to the definition in this specification, the computer-readable medium does not include transitory computer-readable media (transitory media), for example, a modulated data signal and carrier.

It should be further noted that the terms "include," "comprise" or any other variations thereof are intended to cover non-exclusive inclusion, so that a process, method, article or device including a series of elements not only includes the elements, but also includes other elements not clearly listed, or further includes inherent elements of the process, method, article or device. In the absence of more limitations, an element defined by "including a/an . . . " does not exclude that the process, method, article or device including the element further has other identical elements.

The above described methods may be implemented by a computer-executable instruction executed by a computer, for example, a program module. Generally, the program module includes a routine, a program, an object, an assembly, a data structure, and the like used for executing a specific task or implementing a specific abstract data type. The above described methods may also be implemented in distributed computing environments, and in the distributed computing environments, a task is executed by using remote processing devices connected through a communications network. In the distributed computing environments, the program module may be located in local and remote computer storage media including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A payment method, comprising:
  acquiring a side face image from at least one side of a to-be-identified user;
  performing a similarity comparison between the acquired side face image and a recorded side face image corresponding to a payment electronic account to obtain a side face similarity;
  identifying whether the to-be-identified user is an authorized user of the payment electronic account based on at least the side face similarity; and
  making a deduction operation on the payment electronic account if it is identified that the to-be-identified user is an authorized user of the payment electronic account,
  wherein the performing a similarity comparison between the acquired side face image and a recorded side face image corresponding to the payment electronic account comprises: adjusting, based on positions of key points on the acquired side face image, the acquired side face image to obtain a standard side face image for the similarity comparison, wherein the standard side face image is of a specified size, and a side face in the standard side face image has a specified posture.

2. The method according to claim 1, further comprising:
  acquiring a frontal face image of the to-be-identified user;
  performing a similarity comparison between the acquired frontal face image and a recorded frontal face image corresponding to the payment electronic account to obtain a frontal face similarity; and
  identifying whether the to-be-identified user is an authorized user of the payment electronic account according to the frontal face similarity and the side face similarity.

3. The method according to claim 1, wherein the performing a similarity comparison between the acquired side face image and a recorded side face image corresponding to the payment electronic account further comprises:
  extracting a first side face feature vector of the to-be-identified user according to the standard side face image;
  acquiring a second side face feature vector corresponding to the recorded side face image; and
  calculating a similarity between the acquired side face image and the recorded side face image based on the first side face feature vector and the second side face feature vector.

4. The method according to claim 1, wherein the adjusting the acquired side face image to obtain a standard side face image comprises:
  determining the positions of the key points on the acquired side face image, wherein the key points comprise an ear hole center and a tip of nose; and
  adjusting the acquired side face image based on a position of the ear hole center on the acquired side face image, a position of the tip of nose on the acquired side face image, and relative positions of the ear hole center and the tip of nose, to obtain the standard side face image.

5. The method according to claim 3, wherein the calculating a similarity between the acquired side face image and the recorded side face image based on the first side face feature vector and the second side face feature vector comprises:
  calculating a Euclidean distance between the first side face feature vector and the second side face feature vector; and
  determining the Euclidean distance as the similarity between the acquired side face image and the recorded side face image.

6. The method according to claim 2, wherein the identifying whether the to-be-identified user is an authorized user of the payment electronic account according to the frontal face similarity and the side face similarity comprises:
  if the frontal face similarity is greater than a first set threshold and the side face similarity is greater than a second set threshold, determining that the to-be-identified user is an authorized user of the payment electronic account.

7. A payment device, comprising:
  a processor; and
  a memory configured to store computer-executable instructions, wherein when executing the computer-executable instructions, the processor performs:
  acquiring a side face image from at least one side of a to-be-identified user;
  performing a similarity comparison between the acquired side face image and a recorded side face image corresponding to a payment electronic account to obtain a side face similarity;

identifying whether the to-be-identified user is an authorized user of a payment electronic account based on at least the side face similarity; and making a deduction operation on the payment electronic account if the to-be-identified user is an authorized user of the payment electronic account, wherein the performing a similarity comparison between the acquired side face image and a recorded side face image corresponding to the payment electronic account comprises: adjusting, based on positions of key points on the acquired side face image, the acquired side face image to obtain a standard side face image for the similarity comparison, wherein the standard side face image is of a specified size, and a side face in the standard side face image has a specified posture.

8. The payment device according to claim 7, wherein, when executing the computer-executable instructions, the processor further performs:

acquiring a frontal face image of the to-be-identified user;

performing a similarity comparison between the acquired frontal face image and a recorded frontal face image corresponding to the payment electronic account to obtain a frontal face similarity; and identifying whether the to-be-identified user is an authorized user of the payment electronic account according to the frontal face similarity and the side face similarity.

9. The payment device according to claim 7, wherein, when executing the computer-executable instructions, the processor further performs:

extracting a first side face feature vector of the to-be-identified user according to the standard side face image;

acquiring a second side face feature vector corresponding to the recorded side face image; and calculating a similarity between the acquired side face image and the recorded side face image based on the first side face feature vector and the second side face feature vector.

10. The payment device according to claim 7, wherein, when executing the computer-executable instructions, the processor further performs:

determining the positions of the key points on the acquired side face image, wherein the key points comprise an ear hole center and a tip of nose; and adjusting the acquired side face image based on a position of the ear hole center on the acquired side face image, a position of the tip of nose on the acquired side face image, and relative positions of the ear hole center and the tip of nose, to obtain the standard side face image.

11. The payment device according to claim 8, wherein, when executing the computer-executable instructions, the processor further performs:

if the frontal face similarity is greater than a first set threshold and the side face similarity is greater than a second set threshold, determining that the to-be-identified user is an authorized user of the payment electronic account.

12. A payment system, comprising a client terminal device and a payment apparatus, wherein the client terminal device is provided with at least one side face image collector and an image collection controller;

the image collection controller is configured to: when a to-be-identified user performs a payment using a payment electronic account, control the side face image collector to collect a side face image of the to-be-identified user;

the client terminal device is configured to send the frontal face image and the side face image to the payment apparatus; and the payment apparatus is configured to:

acquire the side face image;

perform a similarity comparison between the acquired side face image and a recorded side face image corresponding to the payment electronic account to obtain a side face similarity;

identify whether the to-be-identified user is an authorized user of the payment electronic account based on at least the side face similarity; and make a deduction operation on the payment electronic account if the to-be-identified user is an authorized user of the payment electronic account, wherein performing a similarity comparison between the acquired side face image and a recorded side face image corresponding to the payment electronic account comprises: adjusting, based on positions of key points on the acquired side face image, the acquired side face image to obtain a standard side face image for the similarity comparison, wherein the standard side face image is of a specified size, and a side face in the standard side face image has a specified posture.

13. The system according to claim 12, wherein the client terminal device is further provided with a frontal face image collector;

the image collection controller is further configured to:

when the to-be-identified user performs the payment using the payment electronic account, control the frontal face image collector to simultaneously collect a frontal face image of the to-be-identified user;

the client terminal device is further configured to send the frontal face image to the payment apparatus; and the payment apparatus is further configured to:

perform a similarity comparison between the acquired frontal face image and a recorded frontal face image corresponding to the payment electronic account to obtain a frontal face similarity; and identify whether the to-be-identified user is an authorized user of the payment electronic account according to the frontal face similarity and the side face similarity.

14. The system according to claim 12, wherein the payment apparatus is further configured to:

extract a first side face feature vector of the to-be-identified user according to the standard side face image; acquire a second side face feature vector corresponding to the recorded side face image; and calculate a similarity between the acquired side face image and the recorded side face image based on the first side face feature vector and the second side face feature vector.

15. The system according to claim 12, wherein the payment apparatus is further configured to:

determine the positions of the key points on the acquired side face image, wherein the key points at least comprise an ear hole center and a tip of nose; and adjust the acquired side face image based on a position of the ear hole center on the acquired side face image, a position of the tip of nose on the acquired side face image, and relative positions of the ear hole center and the tip of nose, to obtain the standard side face image.

16. The system according to claim 13, wherein the payment apparatus is further configured to:

if the frontal face similarity is greater than a first set threshold and the side face similarity is greater than a second set threshold, determine that the to-be-identified user is an authorized user of the payment electronic account.

17. A non-transitory storage medium storing computer-executable instructions that, when executed by a processor of a device, cause the device to perform:
acquiring a side face image from at least one side of a to-be-identified user;
performing a similarity comparison between the acquired side face image and a recorded side face image corresponding to a payment electronic account to obtain a side face similarity;
identifying whether the to-be-identified user is an authorized user of a payment electronic account based on at least the side face similarity; and
making a deduction operation on the payment electronic account if it is identified that the to-be-identified user is an authorized user of the payment electronic account,
wherein the performing a similarity comparison between the acquired side face image and a recorded side face image corresponding to the payment electronic account comprises: adjusting, based on positions of key points on the acquired side face image, the acquired side face image to obtain a standard side face image for the similarity comparison, wherein the standard side face image is of a specified size, and a side face in the standard side face image has a specified posture.

* * * * *